United States Patent
Waters

(10) Patent No.: US 8,536,982 B2
(45) Date of Patent: Sep. 17, 2013

(54) AUTOMATIC TUNING FOR RFID SYSTEMS BY CHANGING CAPACITOR VALUES IN CASE OF AN ERROR

(75) Inventor: John Waters, Bath (GB)

(73) Assignee: Palm, Inc., Sunnyvale, CA (US)

( * ) Notice: Subject to any disclaimer, the term of this patent is extended or adjusted under 35 U.S.C. 154(b) by 1039 days.

(21) Appl. No.: 11/718,227

(22) PCT Filed: Oct. 26, 2005

(86) PCT No.: PCT/EP2005/055566
§ 371 (c)(1),
(2), (4) Date: Sep. 3, 2008

(87) PCT Pub. No.: WO2006/045817
PCT Pub. Date: May 4, 2006

(65) Prior Publication Data
US 2009/0002175 A1    Jan. 1, 2009

(30) Foreign Application Priority Data

Oct. 9, 2004  (GB) .................................. 0424099.0

(51) Int. Cl.
*H04Q 5/22* (2006.01)
*G08B 13/14* (2006.01)
*H04L 27/06* (2006.01)

(52) U.S. Cl.
USPC ..... 340/10.1; 340/10.3; 340/10.4; 340/572.5; 375/344

(58) Field of Classification Search
USPC ........ 340/10.1–10.3, 12.51, 13.26, FOR. 102
See application file for complete search history.

(56) References Cited

U.S. PATENT DOCUMENTS

| | | | |
|---|---|---|---|
| 5,374,930 A | | 12/1994 | Schuermann er al. |
| 5,550,548 A | * | 8/1996 | Schuermann .................... 342/42 |
| 5,585,617 A | * | 12/1996 | Ohbuchi et al. ................ 235/491 |
| 5,729,236 A | * | 3/1998 | Flaxl .............................. 342/374 |
| 5,804,888 A | * | 9/1998 | Murr et al. .................... 307/10.2 |
| 6,028,503 A | * | 2/2000 | Preishuberpflugl et al. .. 340/10.4 |
| 6,070,803 A | * | 6/2000 | Stobbe .......................... 235/492 |
| 6,317,027 B1 | * | 11/2001 | Watkins ....................... 340/10.1 |

(Continued)

FOREIGN PATENT DOCUMENTS

| | | |
|---|---|---|
| EP | 0625832 A1 | 11/1994 |
| EP | 681192 A2 * | 11/1995 |

(Continued)

OTHER PUBLICATIONS

Examination Report Under Section 18 (3) received in GB Application No, 04240990,0, mailed Apr. 7, 2009, pp. 5.

(Continued)

*Primary Examiner* — Daniel Wu
*Assistant Examiner* — Muhammad Adnan

(57) ABSTRACT

A reader for reading a memory tag comprises a resonant circuit part, a frequency source, a tuning detector and a tuning controller. The resonant circuit part has a resonant frequency. The frequency source is operable to generate a driving signal and is connected to the resonant circuit part to provide inductive coupling to a tag. The tuning detector is responsive to the relative resonant frequencies of the resonant circuit part and a memory tag resonant circuit part of the memory tag to generate a tuning signal. The tuning controller is responsive to the tuning signal to control the resonant frequency of the resonant circuit part.

19 Claims, 6 Drawing Sheets

(56) References Cited

U.S. PATENT DOCUMENTS

| | | | |
|---|---|---|---|
| 6,476,708 B1 * | 11/2002 | Johnson | 340/10.34 |
| 6,650,227 B1 * | 11/2003 | Bradin | 340/10.3 |
| 6,703,920 B2 * | 3/2004 | Zimmer | 340/10.34 |
| 7,444,118 B2 * | 10/2008 | Boh et al. | 455/39 |
| 7,916,000 B2 * | 3/2011 | Tucker et al. | 340/10.1 |
| 2003/0102960 A1 | 6/2003 | Beigel et al. | |
| 2004/0099738 A1 * | 5/2004 | Waters | 235/451 |
| 2007/0091006 A1 * | 4/2007 | Thober et al. | 343/745 |
| 2007/0142088 A1 * | 6/2007 | Boh et al. | 455/562.1 |

FOREIGN PATENT DOCUMENTS

| | | |
|---|---|---|
| EP | 1168226 A1 | 1/2002 |
| GB | 2321726 A * | 8/1998 |
| WO | WO 9613792 A1 * | 5/1996 |
| WO | WO-02/37414 A1 | 5/2002 |

OTHER PUBLICATIONS

Examination Report Under Section 18 (3) received in GB Application No. 04240990.0, mailed Jul. 16, 2009, pp. 3.

Examination Report Under Section 18 (3) received in GB Application No. 04240990.0, mailed Sep. 19, 2008, pp. 5.

GB Search Report Under Section 17(5) received in GB Appiication No. 0424099.0, mailed Mar. 24, 2005, pp. 3.

International Search Report and Written Opinion received in PCT Application No, PCT/EP2005/055566, mailed May 23, 2006, pp. 22.

* cited by examiner

AUTOMATIC TUNING FOR RFID SYSTEMS BY CHANGING CAPACITOR VALUES IN CASE OF AN ERROR

RELATED APPLICATIONS

The present application is a National Phase entry based on International Application Number PCT/EP2005/055566, filed Oct. 26, 2005, which in turn corresponds to GB Application Number 0424099.0, filed Oct. 29, 2004, the disclosure of each of which is hereby incorporated by reference herein in its entirety.

FIELD OF THE INVENTION

This invention relates to a memory tag, and a reader.

BACKGROUND OF THE INVENTION

Transponder devices in the form of Radio Frequency Identification (RFID) tags are well known in the prior art, comprising an integrated circuit with information stored on it and a coil which enables it to be interrogated by a read/write device generally referred to as a reader, for use in a variety of different applications.

Although it is known to provide such RFID tags with their own power source, in many applications the tag is also powered by the radio frequency signal generated by the reader. Such a known system is shown in FIG. 1 where a reader is indicated generally at 10 and a tag at 12. The reader 10 comprises a radio frequency generator 13 and a resonant circuit part 11, in the present example comprising an inductor 14 and a capacitor 15 connected in parallel. The inductor 14 comprises a antenna. The resonant circuit part will have a particular resonant frequency in accordance with the capacitance and inductance of the capacitor 15 and the inductor 14, and the frequency generator 13 is operated to generate a signal at that resonant frequency.

The tag 12 similarly comprises a resonant circuit part generally illustrated at 16, a rectifying circuit part generally indicated at 17 and a memory 18. The resonant circuit part 16 comprises an inductor 19 which again comprises in this example a loop antenna, and a capacitor 20. The resonant circuit part 16 will thus have a resonant frequency set by the inductor 19 and capacitor 20. The resonant frequency of the resonant circuit part 16 is selected to be the same as that of the reader 10. The rectifying part comprises a forward-biased diode 21 and a capacitor 22 and thus effectively acts as a half-ware rectifier.

When the reader 10 is brought sufficiently close to the tag 12, a signal generated by the frequency generator 13 will cause the resonant circuit part 11 to generate a high frequency electromagnetic field. When the resonant circuit part 16 is moved within this field, a current will be caused to flow in the resonant circuit part 16, drawing power from the time varying magnetic field generated by the reader. The rectifying circuit part 17 will then serve to smooth the voltage across the resonant frequency part and provide a DC power supply to the tag's memory 18. The rectifying circuit part 17 is sufficient to supply a sufficiently stable voltage to the memory 18 for the memory to operate.

To transmit data from the tag to the reader, the resonant circuit part is also provided with a switch 23, here comprising a field effect transistor (FET). The FET is connected to the memory by a control line 24. When the switch 23 is closed, it causes an increased current to flow in the tag resonant circuit part 16. This increase in current flow in the tag results in an increased current flow in the reader's resonant circuit part 11 which can be detected as a change in-voltage drop across the reader inductor 14. Thus, by controlling the switch 23, data stored in the memory 18 of the tag 12 can be transmitted to the reader 10.

A problem with such known systems is that although the components of the resonant circuit parts 11, 16 may have the same nominal value, in practice de-tuning of one or both resonant circuit parts can occur, for example because of differences in nominal and actual values of components or from interaction between the antennae 14, 19. The results of such de-tuning can cause undesirable effects. In particular, an amplitude modulated signal can be corrupted into a phase modulated signal with little or no amplitude variation being present. In International Patent Application No. WO 98/20263, a reader is provided which is operable to perform amplitude and phase the demodulation of the returned signal, and also to attempt some tuning of the reader antenna depending on the value of the detected phase between a reference signal and a signal returned from the antenna coil. This solution is however complex and further takes into account of the power supplied to the memory tag.

SUMMARY OF THE INVENTION

According to an aspect of the invention, we provide a reader for reading a memory tag, the reader comprising a controllable resonant circuit part having a resonant frequency, a frequency source operable to generate a driving signal and connected to the resonant circuit part to provide inductive coupling to a tag, a tuning detector responsive to the relative resonant frequencies of the resonant circuit part and a memory tag resonant circuit to generate a tuning signal, and a tuning controller responsive to the tuning signal to control resonant frequency of the resonant circuit part.

BRIEF DESCRIPTION OF THE DRAWINGS

An embodiment of the present invention will now be described by way of example only with reference to the accompanying drawings, wherein.

DETAILED DESCRIPTION OF THE PREFERRED EMBODIMENTS

Figure 2:
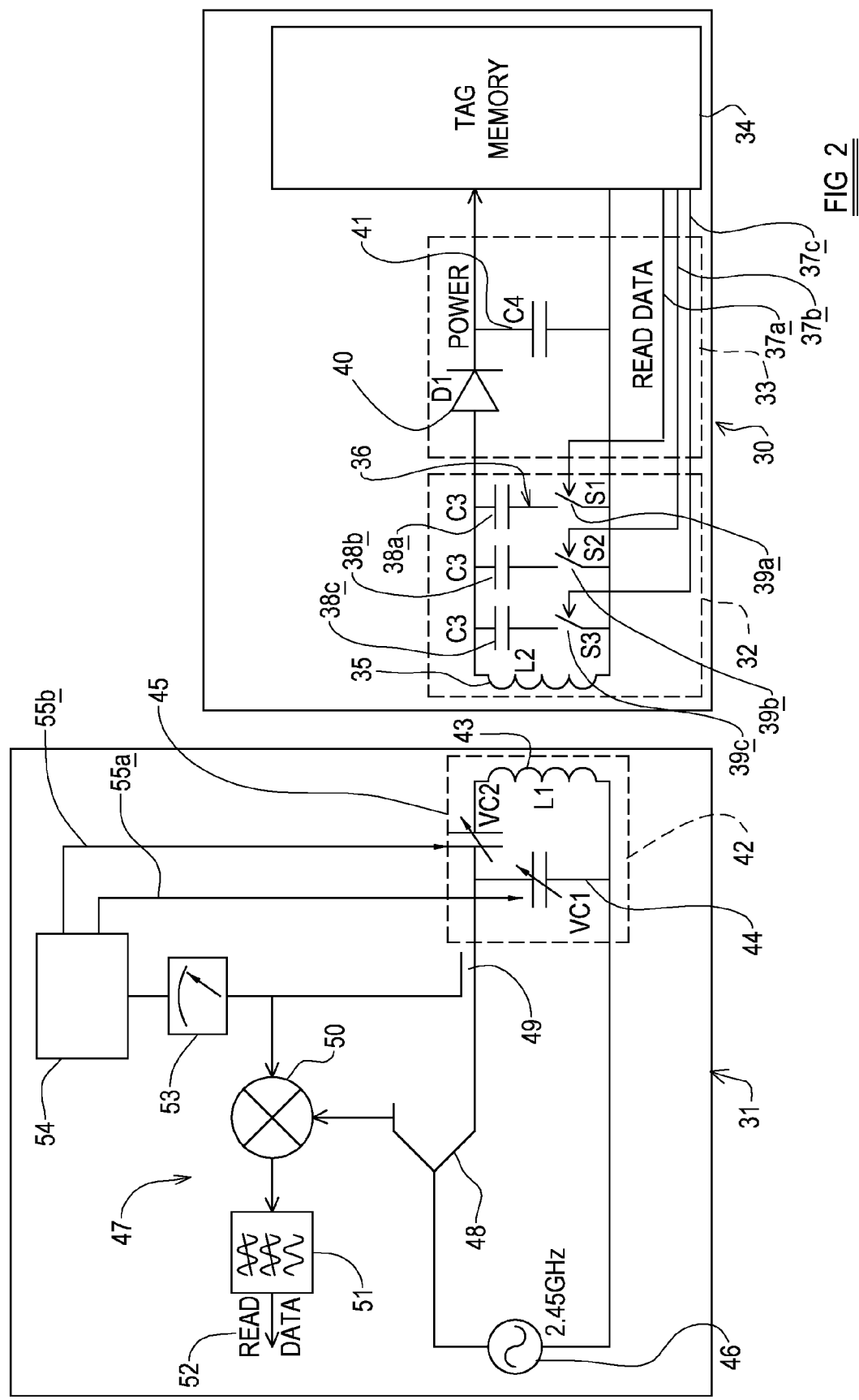
FIG. 2 is a diagrammatic illustration of a circuit for a memory tag and reader embodying the present invention.
Figure 3:
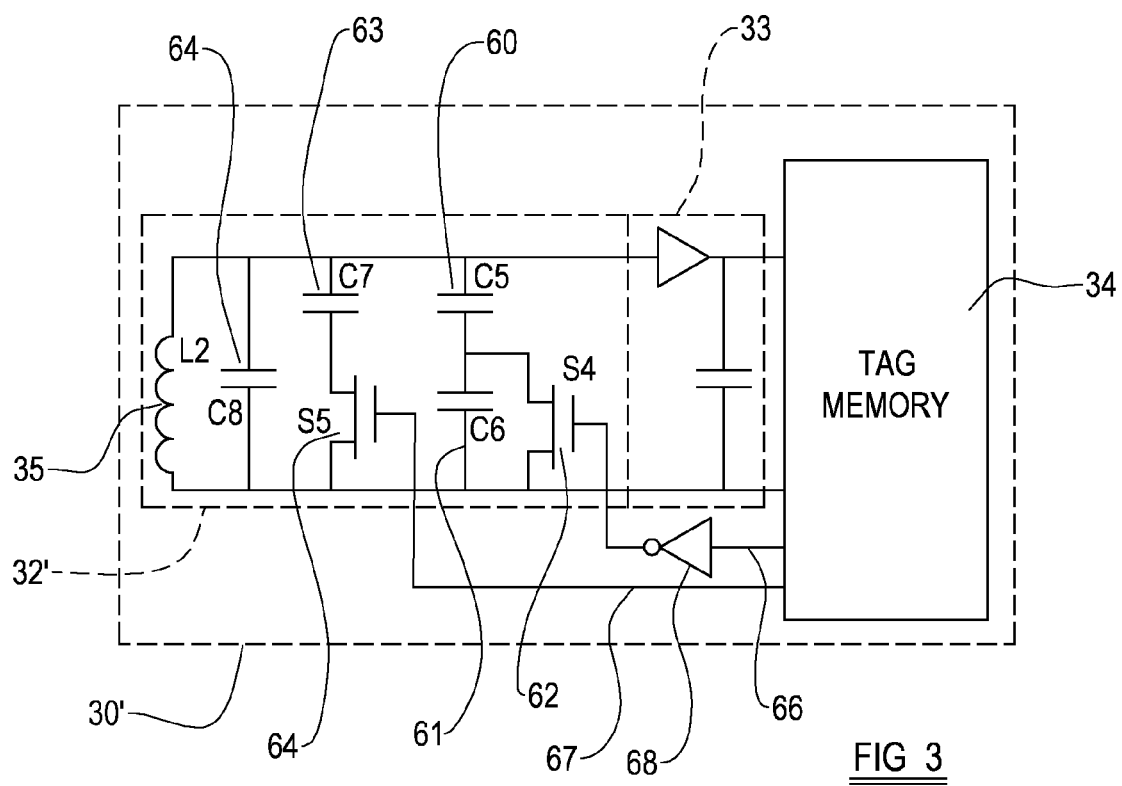
FIG. 3 is a diagrammatic circuit diagram of a further memory tag embodying the present invention.

Referring now to FIGS. 2 and 3, a memory tag embodying the present invention is shown at 30 and a reader shown at 31. In this description 'memory tag' is intended to refer generally to a transponder device having a memory in which data is stored and where the transponder device is readable and powered by an appropriate reader through a radio-frequency wireless communication link, in the present example through inductive coupling. The term 'memory tag' may thus cover, but is not limited to, read only RFID devices and transponder devices with a memory which may be read and written to.

Figure 1:
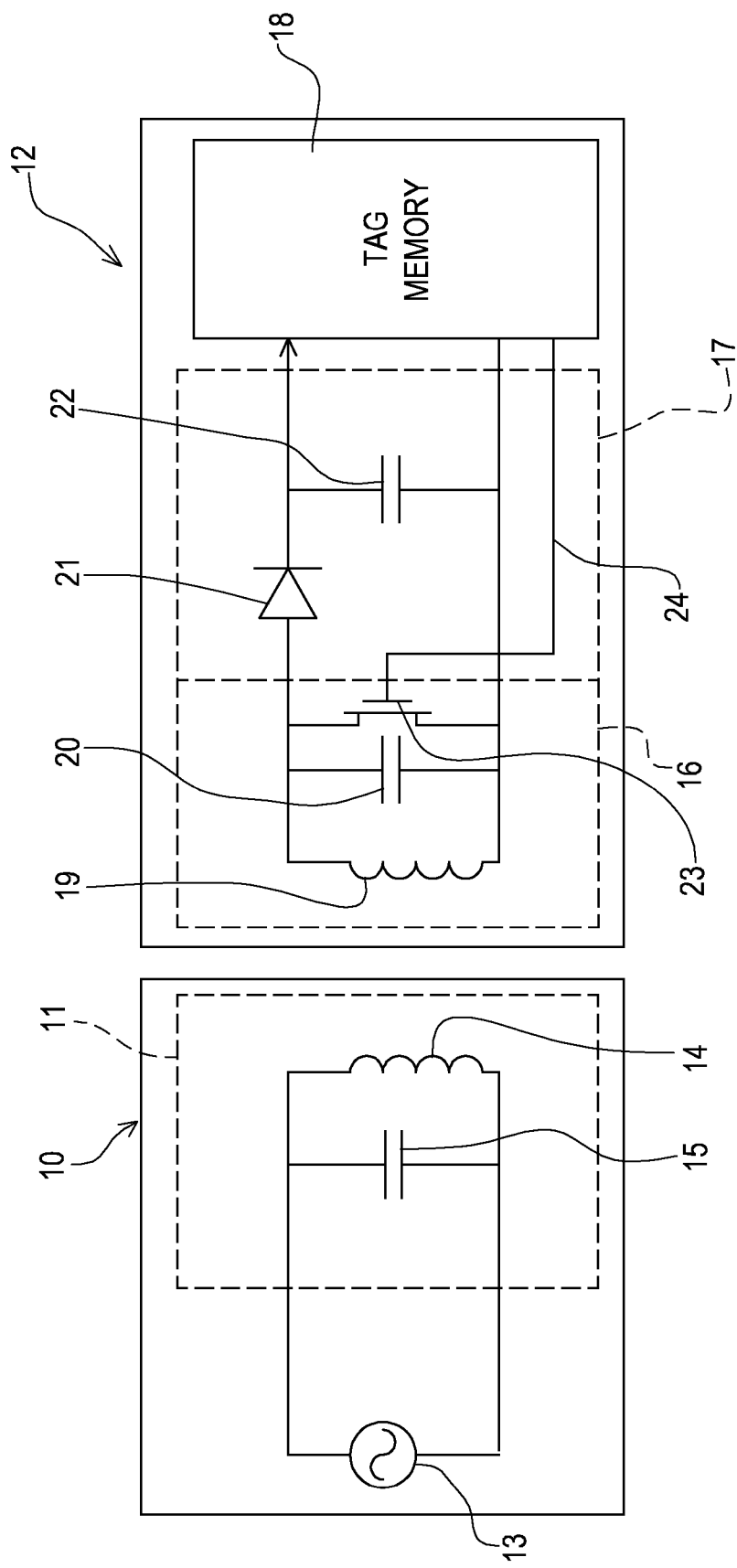
FIG. 1 is a schematic circuit diagram of a memory tag and reader of known type.

The memory tag 30 comprises a memory tag resonant circuit part 32 and a rectifying circuit part 33, together with a memory 34. The resonant circuit part 32 comprises an inductor L2 shown at 35. The resonant circuit part 32 further comprises a controllable capacitive element generally indicated at 36, in the example of FIG. 2 comprising these capacitors C1, C2, C3 shown at 38a, 38b, 38c respectively each selected by a corresponding switch S1, S2, S3 shown at 39a, 39b, 39c respectively. The rectifying circuit part 33 comprises a diode D1 shown at 40 connected to the resonant circuit part 32 in a forward biased direction and a capacitor C4 shown at 41 connected in parallel with the components of the resonant circuit part 32. The rectifying circuit part 33 operates in like manner to the rectifying circuit part 17 of FIG. 1 as a half-wave rectifier to provide power to the memory 34.

The values of capacitors C1, C2 and C3 are selected such that when the inductor L2 and one of the capacitors, for example capacitor C1, are connected in parallel, the resonant circuit part has a resonant frequency having a first value which generally equals to the nominal resonant frequency for coupling between the reader 31 and memory tag 32. The capacitors C2, C3 are selected to have appropriate capacitance such that, the difference between capacitance of capacitor C2 and C1 is equal to the difference between the capacitance of capacitors C1 and C3, so and the capacitance of C1 lies between those of C2 and C3. The effect of this is that when a further one of the capacitors, i.e. capacitor C2 or capacitor C3 is selected, the resonant frequency of a resonant circuit part 32 is set either to a second value or a third value respectively, an equal frequency difference above or below the nominal resonant frequency corresponding to the capacitor C1. One of the capacitors C1, C2, C3 may be selected by operating the appropriate corresponding switch S1, S2, S3 under the control of a program running on the memory 34, as illustrated by control lines 37a, 37b, 37c.

It will be apparent that other appropriate circuits may be provided to generate appropriate first, second and third resonant frequency values for the resonant circuit parts of 32. A further appropriate configuration is shown in FIG. 3 where a memory tag 30 is provided with an alternative resonant circuit part 32'.

In this circuit, a first capacitor C5 shown at 60 and a second capacitor C6 shown at 61 are connected in series and together in parallel with the inductor L2. A switch S4, shown in 62, connected across capacitor C6 to short out the capacitor C6 when required. A third capacitor C7, shown at 63 is connected in parallel with the inductor L2, and in series with a switch S5 shown at 64. Finally, a fourth capacitor C8 shown at 64 is connected in parallel with the inductor L2. The switches S4, S5 are controlled by a program running on the memory 34 as shown by control line 66, 67 respectively. A NOT gate 68 is included in the control line 66.

This configuration is operable in such a way that when the memory tag 35 is initially powered and the control lines 66, 67 are both low, the switch S5 is set to an open circuit and the switch S4 is set to be a short circuit where, when the capacitors C5, C6, C7, C8 all have the same value, the first initial capacitance value of the resonant circuit parts 32' will be 2C and the resonant frequency will have a first value accordingly. When it is desired to set the resonant frequency of the resonant circuit part 32' to one of the second and third value, line 66 is held high and by selecting low or high on control line 67, the value of the capacitance can be switched between 3C/2 and 5C/2. In this example, it is first possible to switch between the second and third values of the resonant frequency by operating a single control line rather than two control lines as in the memory tag 30 of FIG. 2.

The reader 31 comprises a reader resonant circuit part 42 which comprises an inductor shown at 43, in this example an antenna. A variable capacitance element comprising a variable capacitor VC1 shown at 44 is connected in parallel to the inductor 43 and a further variable capacitance element VC2 shown at 45 connected in series with the inductor 43. A frequency generator 46 is connected to the resonant circuit part 42 to provide a driving signal.

The reader 31 further comprises a demodulator, generally shown at 46. The demodulator 47 comprises a power splitter 48 connected between the frequency generator 46 and the resonant circuit part 42 to split off a part of the driving signal to provide a reference signal. A coupler 49 is provided to split off a reflected signal reflected back from the resonant circuit part 42, and pass the reflected signal to a multiplier indicated at 50. The multiplier 50 multiplies the reflected signal received from the coupler 49 and the reference signal received from the splitter 48 and passes the output to a low pass filter 51. The low pass filter 51 passes a signal corresponding to the phase difference between the reference signal and the reflected signal to an output 52.

The inductor L1 43 comprises an antenna of the reader 31, and the inductor 35 comprises an antenna of the tag 30.

The reader 31 further comprises a tuning detector, in this example a power meter 53 which is also connected to the coupler 49, and a tuning controller 54 which is operable to control the variable capacitors VC1, VC2 as shown by control lines 55a, 55b. The power monitor 53 is operable to generate an tuning signal based on the power reflected from the resonant circuit part 42: in a simple example the power monitor 53 may be a rectifier circuit and the tuning signal will be a voltage proportional to the returned power. The output signal is passed to the tuning controller 54, which is operable to control the variable capacitors VC1, VC2 as described in more detail below.

The memory tag 30 and reader 31 are operable as follows:

When the memory tag 30 and reader 31 are brought sufficiently close such that inductive coupling occurs between the resonant circuit parts 32, 42 and power is supplied to the tag 30, the capacitance of the resonant circuit part 32, 32' is set to a first value. The tuning controller 54 then controls the variable capacitors VC1 and VC2 to minimize the power reflected from the resonant circuit part 42. The reflected power from the resonant circuit part 42 will be inversely related to the power transferred to the memory tag 30, which itself depends on the relative tuning between the resonant circuit parts 32, 42. The tuning detector, that is the power detector 53, will thus be responsive to the difference in the relative resonant frequencies of the resonant circuit parts 32, 42. Hence, by controlling the resonant circuit part 42 to minimize the reflected power, the resonant circuit part 42 will be tuned to an appropriate resonant frequency to match that of the tag 30.

Figure 4:
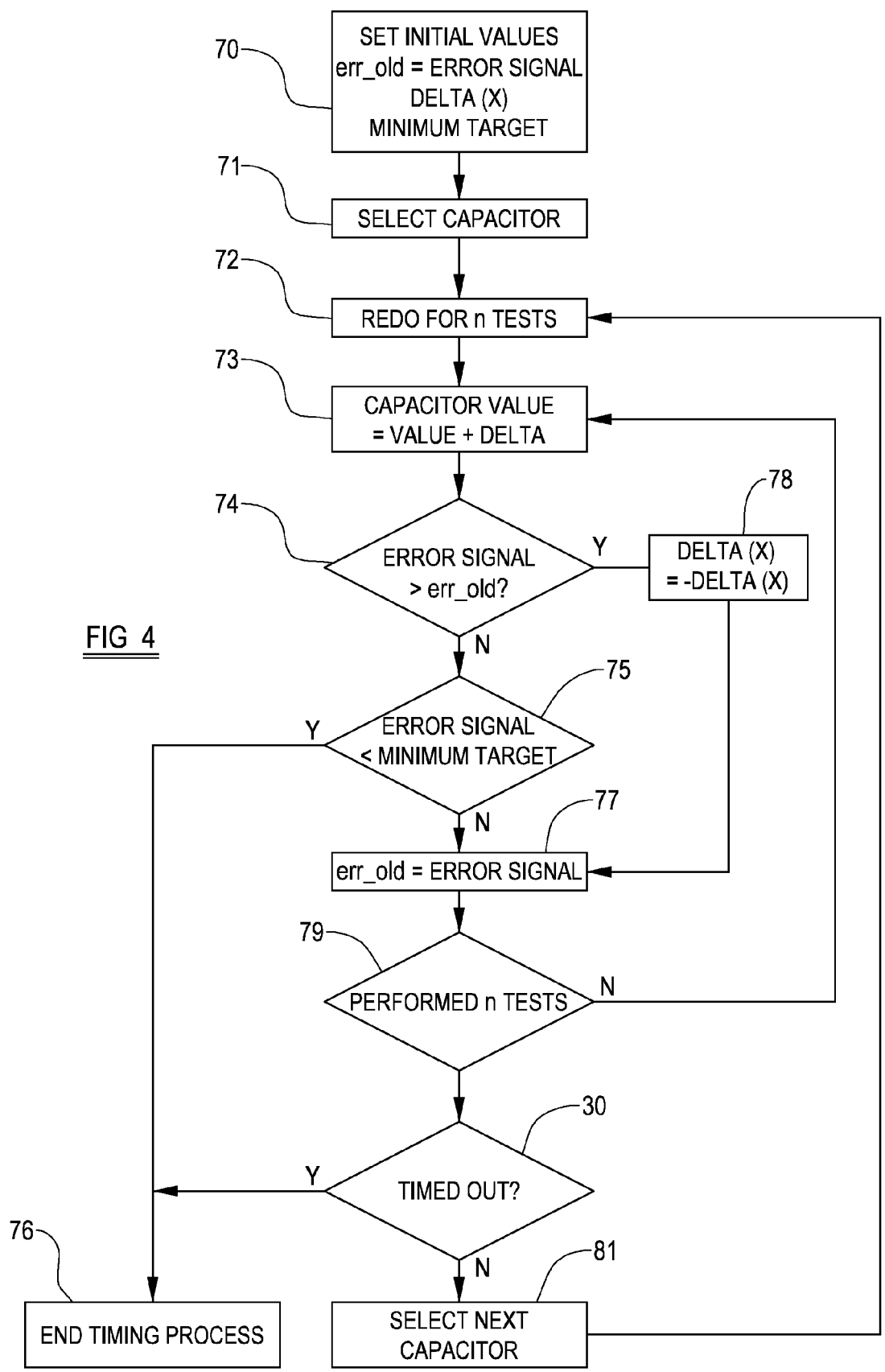
FIG. 4 is a flow chart illustrating a method of listing the reader of FIG. 2.

A method of tuning the resonant circuit part 42 under control of the tuning controller 54 is shown in FIG. 4. At 70, the initial values for the tuning method are set. The error signal is the signal received from the power monitor 53, the variable err_old is a stored previous value of the error signal, Delta (X) is the tuning step by which the values of the variable capacitor are changed, and the minimum target is a value below which it is desired to reduce the error signal from the power monitor 53. In general, the method proceeds by varying the value of one of the variable capacitors, VC1, VC2 for a number of tries, and then varying the value of the other capacitor for a number of tries, and repeating the steps for each capacitor until the method times out or the error signal is reduced below the minimum target.

Thus, at step 71, the first capacitor to be varied is selected and at step 72 the control is set to vary the capacitor and test the error signal for n times. At step 73 the value of the variable capacitor is changed by the amount delta (X), and at step 74 the returned error signal compared with the stored error signal err_old. If the error signal is less then the err_old, then at step 75 it is compared with the minimum target and if the error signal is less than the minimum target as shown at step 76 the tuning process ends and the process of data transfer can begin. If the error signal is not less than the minimum target, then at step 77 err_old is set to equal the error signal. At step 74, if the error signal is greater than the stored error signal, then the reflected power is increasing and the tuning the capacitor has moved away from the minimum value. Hence, at step 78 the delta (X) is set to −1 times its previous value to reverse the direction in which the capacitor value is altered, and the method then proceeds from step 77.

At step 79, if the capacitor value has not been tested n times, the method returns to step 73, the capacitor value is changed by delta (X) and the process repeats again. If the required number of tests has been performed, then at 80 the method checks whether the time out limit has been passed and if so ends the tuning process. Otherwise at step 81 the other variable capacitor is selected and the method returns to step 72 to begin a set of n tests with that capacitor. This thus provides a gradient search method which attempts to locate the best available tuning condition and thus power transfer.

By providing two tuning elements, in this case the variable capacitors VC1, VC2, the tuning method compensates the effects of separation of the antenna and circuit components tolerances in the interrogator and remote device.

When the tuning process has been completed, the program running on the memory 34 is operable to select one of the second value and third value for the capacitance of the resonant circuit element 32, 32' in order to transmit data from the memory tag 30 to the reader 31.

To demodulate the returned signal from the memory tag, it is a known effect of resonant circuits that when the circuit passes a signal which has a frequency less than the resonant frequency of the resonant circuit, a phase lag is introduced to the passed signal frequency, whilst when the frequency is greater than that of the resonant circuit, a phase lead is induced. Thus, by modulating the frequency of the reflected signal by changing the resonant frequency of the resonant circuit part of the tag 30, the reflected signal will have a phase difference relative to the reference signal from the frequency source 46 which may easily be measured by the demodulator as discussed below. The reference signal from the splitter 47 will be of the form $$S(t) = A \cos(\omega t)$$

and the reflected signal R(t) tag will be of the form $$R(t) = a \cos((\omega t + \phi(t))$$

where
A=amplitude of the reference signal,
a=amplitude of the reflected signal
ϕ(t)=the relative phase and
ω=the frequency of the signal generated by the frequency source 45.

R(t) is multiplied by the carrier reference signal S(t) at the multiplier 49, producing a resulting signal $$\frac{aA}{2}\cos(2\omega t + \varphi(t)) + \frac{aA}{2}\cos(\varphi(t))$$

The first of these terms, the second harmonic, is simply filtered by the low pass filter 50 leaving the second term that comprises the phase difference between the reference and reflected signals.

Figure 5A:
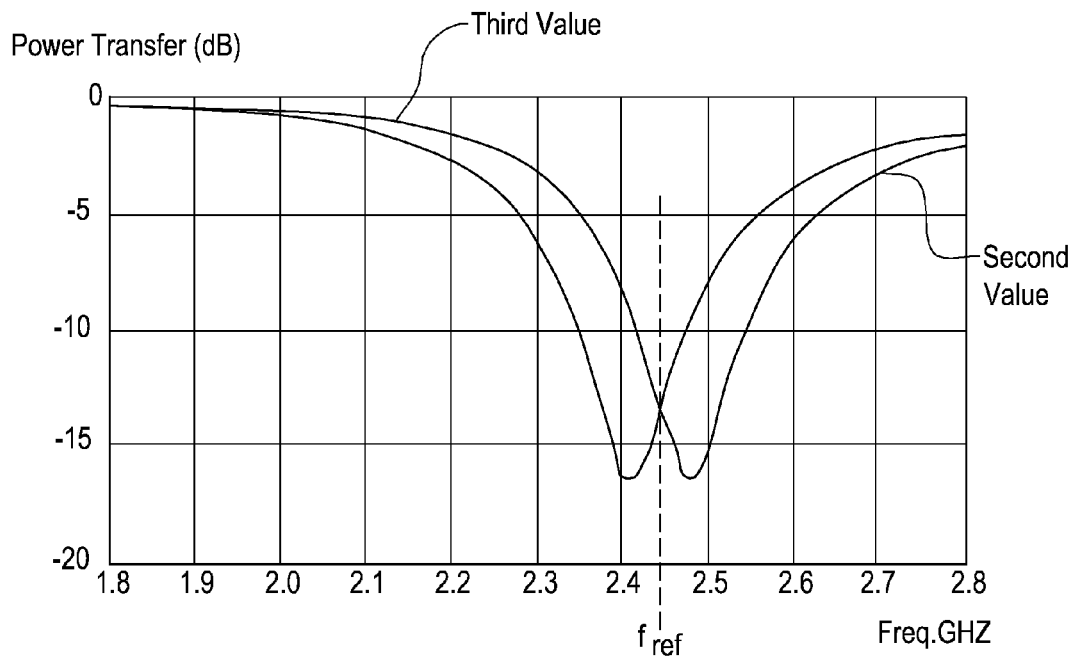
FIG. 5 is a graph showing variation in the amplitude against frequency of a reflected signal detected by the reader.
FIG. 5b is a graph showing variation in the phase against frequency of a reflected signal detected by the reader.
Figure 5B:
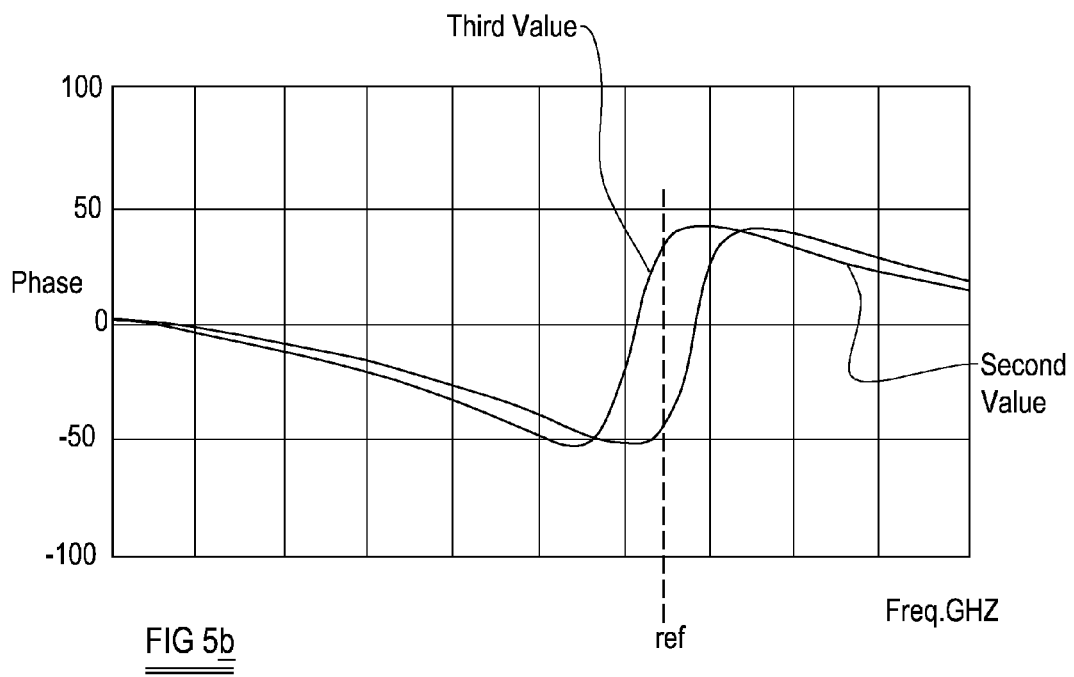

The effects of selecting one of the second value and third value are shown in the graphs of FIGS. 5a and 5b. The graph of FIG. 5a is a plot of the amplitude of the signal reflected back from the memory tag. The minimum of each plot represents the maximum power transfer, when the resonant frequency of the resonant current part 32 matches the frequency of the signal from the frequency source 45. The change in the resonant frequency when the second value is selected and when the third value is selected is apparent from the two plots on the graphs. It will be apparent by selecting the resonant frequencies of the resonant circuit 32 when the second value is selected and the third value is selected such that the resonant frequencies lie either side of the resonant frequency of the resonant circuit part 42, $F_{ref}$, that the curves for intersect as near to $F_{ref}$ as defined by the first value as possible and so there is no or minimal change in the transferred power when S5 is closed and when S5 is open. There is of course some loss in coupling efficiency, in that because the resonant circuit part 32 is slightly de-tuned from the resonant frequency of the resonant circuit 42 which has been tuned with the resonant circuit part set to the first value, maximum power transfer will not occur. However, the relative loss in the power transfer is balanced against the constant power transfer achieved. From the phase plot of FIG. 5b, the relatively small change in resonant frequency leads to a relatively large change in phase with reference to the reference frequency.

Figure 6:
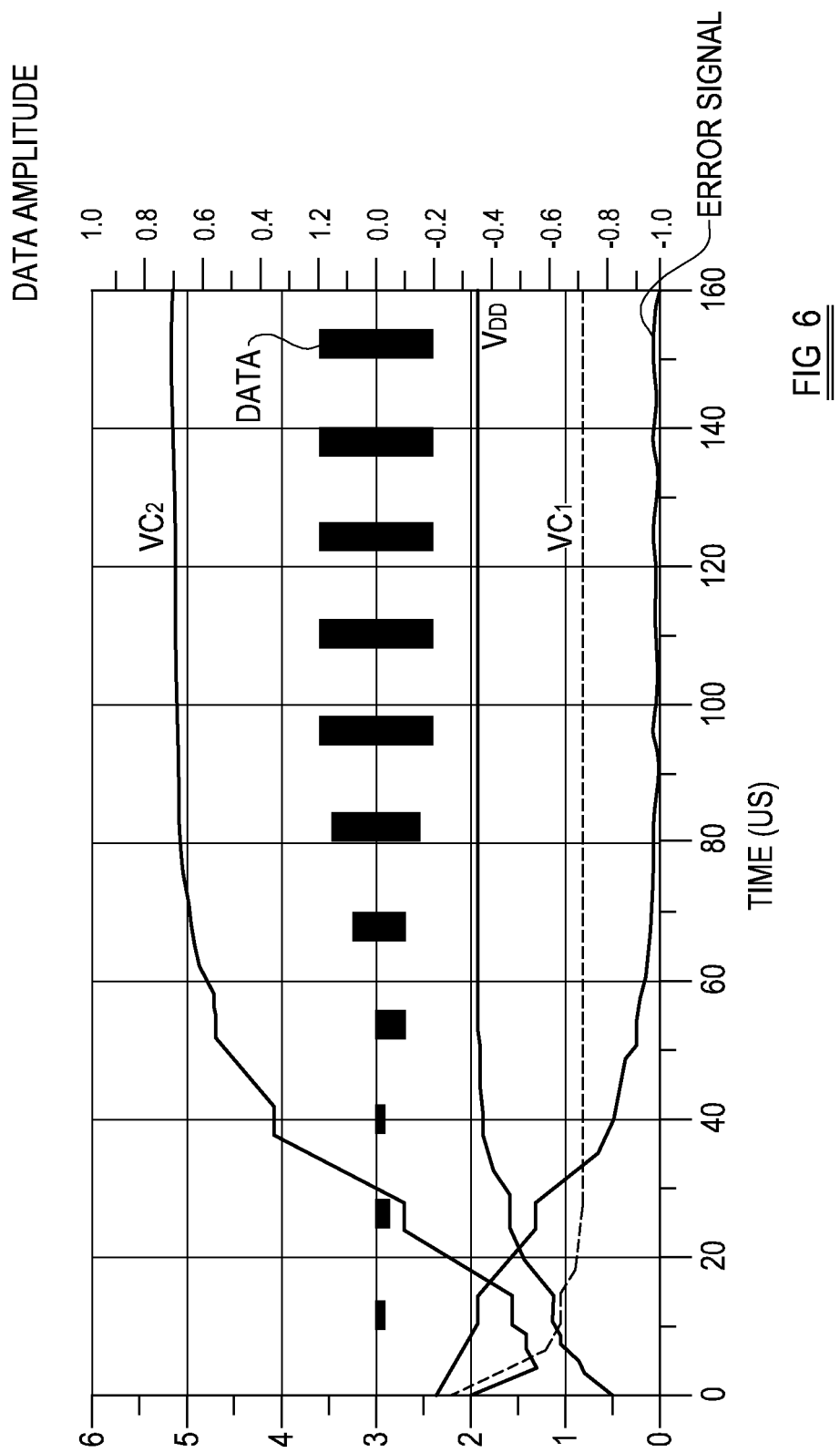
FIG. 6 is a graph showing the amplitude of data transmitted by the tag of FIG. 2, an output voltage provided by a rectifying circuit of the tag of FIG. 2 and an error signal and capacitance values of the reader of FIG. 2.

Where, for example, where the second value is selected, to represent digital "one", and where the third value is selected, to represent a digital "0", the relative phase of the reflected signal will vary between one of two values and the output of the demodulator will be a train of pulses as shown in the 'Data' plot of FIG. 6. Meanwhile, because the transferred power is generally constant whichever the value for capacitance of the resonant circuit part is selected. The DC supply generated in the memory tag will be generally constant and stable, as shown in the plot $V_{DD}$ of FIG. 6, while the error signal will fail to approximately send and the capacitors VC1, VC2 will converge on stable values.

In a preferred embodiment, the resonant frequency of the resonant circuit part 42, and hence the frequency of the signal generated by the frequency source 46 is about 2.45 GHz, and the resonant frequency of the resonant circuit part 32 is modulated by about 0.05 GHz either side of this reference frequency. At this frequency, component values for the inductors and the capacitors are small—for example, the overall capacitance of the resonant circuit part may be about 0.3 pF—allowing easy integration of the circuit and require relatively small areas of silicon on an integrated circuit. It is particularly desirable that the tag 30 be provided as a integrated circuit, for example as a CMOS integrated circuit.

The scheme of the present invention is effective to implement, and is practicable at GHz frequencies (here defined as frequencies greater than 1 GHz).

Although the embodiments described herein use a variable capacitance element to vary the resonant frequency of the tag resonant circuit part, it will be apparent that the resonant frequency may be varied by other means as desired. For example, a variable inductive element may be provided, or a second inductor may be switched in and out of the resonant circuit part.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realising the invention in diverse forms thereof.

The invention claimed is:

1. A reader for reading a memory tag, the reader comprising:
   a resonant circuit component having a resonant frequency and comprising at least a first variable capacitive element and a second variable capacitive element;
   a frequency source operable to generate a driving signal and coupled to the resonant circuit component to provide inductive coupling to the memory tag;
   a tuning detector configured to generate a tuning signal responsive to relative resonant frequencies of the resonant circuit component and a resonant circuit component of the memory tag; and
   a tuning controller, responsive to the tuning signal, to control the resonant frequency of the resonant circuit component, the tuning controller being configured to perform a tuning operation of the resonant circuit component by:
   (i) changing a value of the first variable capacitive element while detecting an error signal provided by the resonant circuit component a first predetermined number of times,
   (ii) then changing a value of the second variable capacitive element while detecting the error signal a second predetermined number of times, each of the first and second predetermined numbers being greater than zero, and
   (iii) repeating (i) and (ii) until the error signal is determined to be less than a threshold error amount or until a time out limit has been reached.

2. The reader of claim 1, wherein the tuning detector is configured to generate the tuning signal based, at least in part, on power reflected from the resonant circuit component, the tuning signal being proportional to the reflected power.

3. The reader of claim 2, wherein the tuning controller is further configured to control the resonant circuit component to minimize power reflected from the resonant circuit component.

4. The reader of claim 1, wherein the resonant circuit component includes an inductive element.

5. The reader of claim 1, wherein the resonant circuit component comprises an inductive element, and wherein the first variable capacitive element is connected in series with the inductive element and the second variable capacitive element is connected in parallel with the inductive element.

6. The reader of claim 1, wherein the tuning controller is further configured to perform the tuning operation on the resonant circuit component when power is initially supplied to the memory tag.

7. The reader of claim 1, wherein the reader is configured to receive information from the memory tag via the resonant circuit component, and wherein the reader further comprises a demodulator configured to (i) compare a reference signal corresponding to the driving signal generated by the frequency source and a reflected signal from the resonant circuit component, and (ii) generate an output depending on a relative phase of the reference signal and the reflected signal, the demodulator comprising a multiplier configured to multiply the reference signal and the reflected signal, and a low pass filter to pass a signal corresponding to the relative phase.

8. A memory tag system comprising:
   a reader comprising:
      a resonant circuit having a resonant frequency and comprising at least
   a first variable capacitive element and a second variable capacitive element; and
      a tuning controller to perform a tuning operation to control the resonant frequency of the resonant circuit by:
      (i) changing a value of the first variable capacitive element while detecting an error signal provided by the resonant circuit a first predetermined number of times,
      (ii) then changing a value of the second variable capacitive element while detecting the error signal a second predetermined number of times, each of the first and second predetermined numbers being greater than zero, and
      (iii) repeating (i) and (ii) until the error signal is determined to be less than a threshold error amount or until a time out limit has been reached; and
   a memory tag comprising a resonant circuit component configured to (i) have a resonant frequency having a first value when the reader and the memory tag are inductively coupled together, and (ii) in response to completion of the tuning operation performed by the reader, select a resonant frequency having a second value or a resonant frequency having a third value for transmitting data to the reader, wherein the first value is in between the second value and the third value.

9. The memory tag system of claim 8, wherein a difference between the first value and the second value is substantially equal to a difference between the first value and the third value.

10. The memory tag system of claim 8, wherein the first value is initially selected when power is supplied from the reader to the memory tag in order to permit a reader to perform the tuning operation.

11. The memory tag system of claim 8, wherein the resonant circuit component of the memory tag comprises a capacitive element and an inductive element, the capacitive element comprising a variable capacitive element that is controllable to vary the resonant frequency.

12. The memory tag system of claim 8, wherein the memory tag further comprises at least one capacitive element to provide the first value and at least one capacitive element to provide at least one of the second value and third value.

13. The memory tag system of claim 12, wherein the memory tag further comprises:
   a first capacitor and a second capacitor connected in series, the first capacitor and the second capacitor being connected in parallel with an inductive element;
   a third capacitor connected in parallel with the inductive element;
   a first switch to provide a connection across the second capacitor; and
   a second switch to select the third capacitor, wherein the second and third capacitors are selectable by the first switch and the second switch to provide the second value or third value.

14. The memory tag system of claim 8, wherein the memory tag further comprises a rectifying circuit component operable to rectify a signal received from the resonant circuit component to supply power to a memory resource, the power supplied by the rectifying circuit component being substantially constant.

15. The memory tag system of claim 8, wherein the first value is selected such that the resonant frequency of the resonant circuit component corresponds to the resonant frequency of the reader.

16. A method of operating a reader for reading a memory tag, the reader including a controllable resonant circuit component having a resonant frequency and comprising at least a first variable capacitance element and a second variable capacitive element, the method comprising:
 generating a driving signal;
 supplying the driving signal to the resonant circuit component to provide inductive coupling to the memory tag;
 generating a tuning signal responsive to relative resonant frequencies of the resonant circuit component and a resonant circuit component of the memory tag; and
 performing a tuning operation of the resonant circuit component in accordance with the tuning signal by:
  (i) changing a value of the first variable capacitive element while detecting an error signal provided by the resonant circuit component a first predetermined number of times,
  (ii) then changing a value of the second variable capacitive element while detecting the error signal a second predetermined number of times, each of the first and second predetermined numbers being greater than zero, and
  (iii) repeating (i) and (ii) until the error signal is determined to be less than a threshold error amount or until a time out limit has been reached.

17. The method of claim 16, wherein generating the tuning signal comprises detecting power reflected from the resonant circuit component.

18. The method of claim 17, further comprising controlling the resonant frequency of the resonant circuit component to minimize the power reflected from the resonant circuit component.

19. The method of claim 16, wherein the resonant circuit component comprises an inductive element, and wherein the first variable capacitive element is connected in a series with the inductive element and the second variable capacitive element is connected in parallel with the inductive element.

* * * * *

UNITED STATES PATENT AND TRADEMARK OFFICE
CERTIFICATE OF CORRECTION

PATENT NO. : 8,536,982 B2  
APPLICATION NO. : 11/718227  
DATED : September 17, 2013  
INVENTOR(S) : John Waters It is certified that error appears in the above-identified patent and that said Letters Patent is hereby corrected as shown below:

On the Title Page, Item (54), and in the Specification, column 1, line 2, Title, delete "CAPACITOR" and insert -- CAPACITORS --, therefor.

On the Title Page, Item (30), Foreign Application Priority Data, in column 1, line 1, delete "Oct. 9, 2004" and insert -- Oct. 29, 2004 --, therefor.

Signed and Sealed this  
Tenth Day of December, 2013

Margaret A. Focarino  
*Commissioner for Patents of the United States Patent and Trademark Office*